Dec. 20, 1949 — W. N. CHITTENDEN — 2,491,605
CHUCK
Filed July 26, 1946 — 2 Sheets-Sheet 1

INVENTOR.
WINDSOR N. CHITTENDEN
BY Justin W. Macklin
ATTY

Dec. 20, 1949 W. N. CHITTENDEN 2,491,605
CHUCK
Filed July 26, 1946 2 Sheets-Sheet 2

INVENTOR.
WINDSOR N. CHITTENDEN,
BY Justin W Macklin
ATTY

Patented Dec. 20, 1949

2,491,605

UNITED STATES PATENT OFFICE 2,491,605

CHUCK

Windsor N. Chittenden, Maple Heights, Ohio

Application July 26, 1946, Serial No. 686,353

10 Claims. (Cl. 279—56)

This invention relates to a chucking device and has for its purpose the provision of a simple positive action device for holding machine tools such as drills, reamers, taps, and the like with positive action and accurate positioning.

A more specific object is to provide in such a chuck a tool carrier of itself capable of securely holding the tool in an exact concentric position and in an adjusted longitudinal position, and which tool carrier shall be capable of being quickly removed or positioned and positively held in an equally accurately machined carrier member.

Another specific object is to provide a novel uniformly effective and durable locking means for holding the tool carrier in an accurately machined tapered seat, and for permitting its removal consequent upon a single movement of an external sleeve or collar.

Still another object is to so arrange the locking means that the sleeve or collar may effectively and securely hold the tool carrier in position, but which may be moved to release the same by a short axial movement which may be effected by hand.

Still another object is to provide for automatically striking the tool carrier with a very light sharp blow to release the tapered surface engagement simultaneously with moving the sleeve or collar to the unlocking position.

Other objects will become apparent in the following description which relates to the accompanying drawings, the essential characteristics of the invention being summarized in the appended claims.

Figure 1:
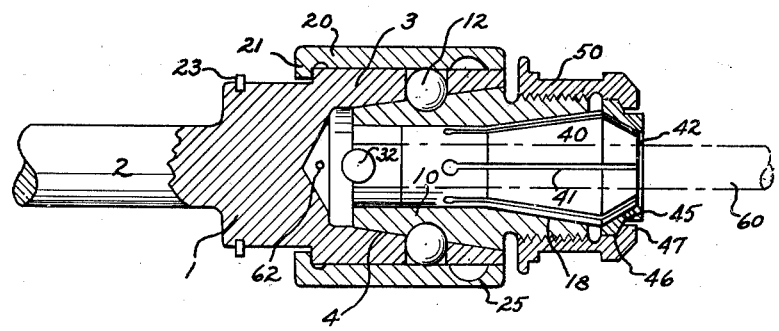
Fig. 1 is an axial section taken on intersecting radial planes indicated by the lines 1—1 on Fig. 2.

One form of my invention in which balls are used for locking means is illustrated particularly in Figs. 1 to 7 in which a body or frame member 1 is carried by a spindle or shaft 2, adapted to cooperate and be carried by the spindle of a machine tool. The body has an enlarged portion 3, having a steep-angle ground internal surface at 4 to receive an accurately fitting tapered surface on a collet carrier 10.

Carried in the head 3 are a plurality of steel balls 12 fitted into uniformly spaced holes 5, and in the collet 10, I provide a groove-like depression 15 accurately machined and ground to fit the balls 12, and having a depth of about one quarter to one third of the diameter of the balls 12.

Figures 2, 5:
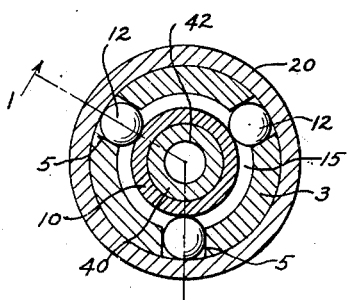
Fig. 2 is a section taken transversely of the axis of the assembly shown in Fig. 1.
Fig. 5 is a top plan of the member shown on Fig. 4.
Figure 3:
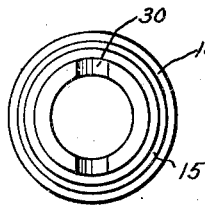
Fig. 3 is an elevation showing the locking sleeve in section.
Figures 6, 7:
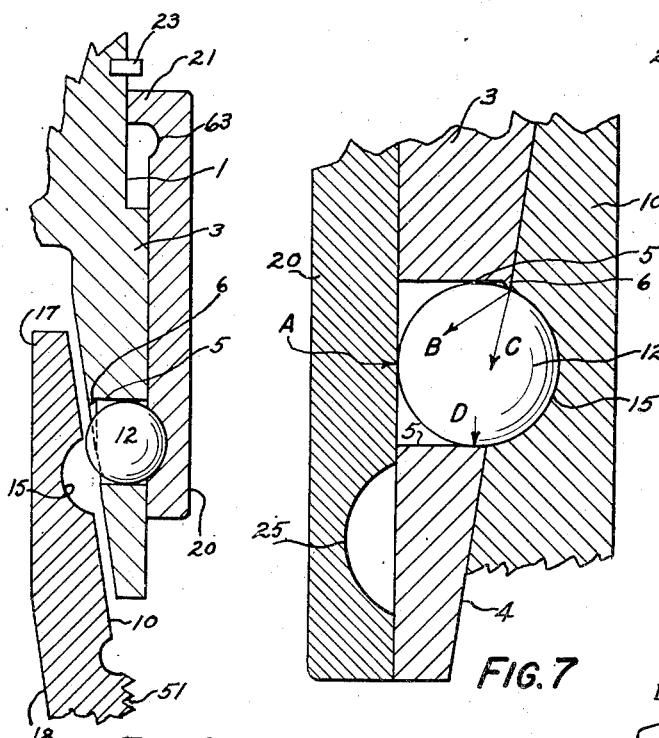
Fig. 6 is an enlarged sectional detail taken on a plane corresponding to that of Fig. 1, showing the position of a locking ball when the tool carrier member is being inserted or removed.
Fig. 7 is a still further enlarged view showing the locked position of a ball, the locking sleeve and tool carrier member.

These balls are pressed inwardly into holding position, as shown in Figs. 1, 2 and 7, by a closely fitting slidable sleeve 20, embracing the enlarged portion 3 of the head 1, and having an inturned flange 21, engaging a shoulder at the inner or upper end of the enlarged portion, limiting its downward movement when in normal running position. A ring 23 may be set into the head portion to limit the movement of the sleeve toward the shank 2.

The balls are prevented from dropping inwardly through the holes by an inturned lip formed on each of the openings 5, as indicated at 6.

The sleeve 20 is provided with an internal groove or channel 25 accurately machined into its inner surface to fit and receive the ball surfaces when the sleeve is moved upwardly into the position shown in Fig. 6. This groove 25 is preferably of a depth approximately one-fourth of the diameter of the balls.

Figure 4:
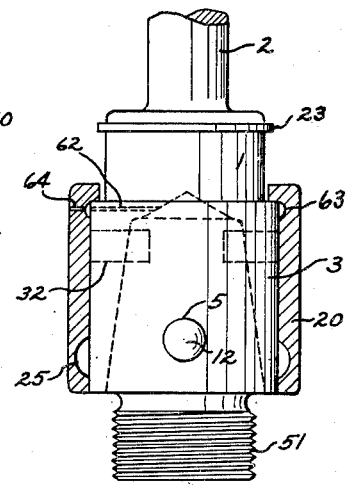
Fig. 4 is a view of the removable tool and collet carrier member.

The collet carrier 10 is provided at its upper end with slots or notches 30, Figs. 4 and 5, which engage inwardly projecting pins 32 to effect positive driving of the carrier member, but which are soft and may shear for the protection of the tool. It will be seen the pins may be readily replaced.

This carrier 10 is provided with a cylindrical inner surface 17 extending from a tapered surface 18 and fitting corresponding surfaces on spring grip member or collet 40. This collet serves to carry a tool which may be a cutting or working tool of any character to be so held and driven. This spring collet shown is suited to the present invention but may nevertheless be of any desired construction, provided only that it is accurately concentric with the carrier member 10, and that it accurately centers a tool carried thereby.

In the form shown, it is slotted at 41 inwardly to the cylindrical portion, thus providing a plurality of spring fingers, the outward ends of which are tapered as shown at 42 to receive locking collar 45, fitted over the taper 42, and which is adapted to be forced inwardly against the collet or gripping fingers by means of coacting flanges 46 and 47. The latter flange is formed on a nut 50, shown as threaded onto threads 51 of the carrier member 10. The action of this collar and nut is such as to allow the nut to slide in turning around the tapered collet, effecting the gripping without twisting or distorting the collet fingers. This characteristic is shown in my prior patent, No. 2,272,185, issued February 10, 1942.

The bore of the collet may receive a closely fitting shank or any suitable tool, indicated in dot and dash lines at 60.

In many uses, the tool collet and carrier may be previously assembled and may be quickly inserted or removed as a unit. Because of the close fit of the parts, as the taper of the carrier 10 comes up into the surface 4 air is entrapped unless vented. Accordingly, I have shown a vent opening 62, leading from the taper cavity in the enlarged portion of the head to the outside of the head (see Figs. 1 and 3). A relief channel 63 may be formed in the sleeve 20, and a small opening 64 may lead from this channel to the exterior of the sleeve 20, thus ensuring venting of the air which may be entrapped as the parts are brought tightly together.

In operation the size of the balls and fit of the sleeve 20, with relation to the depth of the groove 15, is such that the balls are held snugly and preferably under very slight compression in engagement with the holding channel 15 and in the position shown particularly in Figs. 1 and 7.

Referring to Fig. 7, I have shown the position of the parts in locking or holding relation, and here is also shown the action of the balls and the effect of the force exerted on them. Having in mind that the balls may move freely through the openings 5, the inner surface of the sleeve 20 acts on the balls 12 in the direction of the arrow A, pressing the balls into the channel 15. The downward pull which may be only the weight on the balls of the carrier and tool or may be considerable force exerted on the tools 60, as when withdrawing a tap or reamer, is distributed from the upward shoulder on the recess 15 in the direction of arrows B and C, pressing the balls against the lower side of the openings 5 (in line contact) as indicated by the arrow D.

When it is desired to remove the tool carrier, the sleeve 20 may be gripped by the hand and raised, or moved to the left in Fig. 1, bringing the channel 25 in position to receive the balls, whereupon the pressure exerted in the direction of the arrows D and C will move the balls outwardly disengaging them from the groove 15 and allowing the carrier member 10, with its removable parts to pass downwardly (or outwardly to the right of Fig. 1).

In practice, I have found this fit may be as close as two or three ten-thousandths of an inch, and a five-sixteenths of an inch ball will spring without wear on the parts, and, in effect, cause a snap action requiring a slight hand pressure to effect the unlocking operation.

As the body 10 is thus moved outwardly, the tapered surfaces are separated, as shown in Fig. 6. On the insertion of the body, however, a slight compression of the air, ahead of the tool carrier and assembly, will be vented through a radial passage 62 to the space below the flange 21 and be passed out through the opening 64, leading from the relief channel 63.

Figure 8:
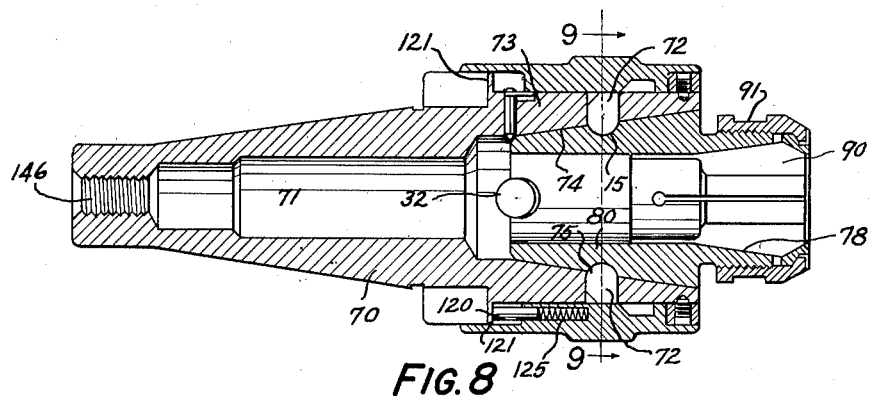
Fig. 8 is an axial section taken on intersecting radial planes, indicated by the lines 8—8 of Fig. 9.
Figure 10:
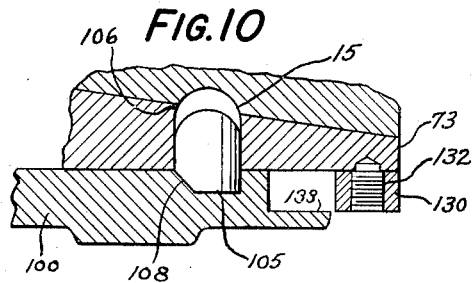
Fig. 10 is an enlarged sectional detail taken on a plane corresponding to that of Fig. 8, showing the releasing position of one of the locking members.

In the modified form, shown in Fig. 8, the body member 70 has a tapered shank, large in proportion to that shown in Fig. 1, and for a different mounting or engaging means.

As in Fig. 1 an enlarged head portion 73 is provided with an accurately ground steep-angle internal surface 74 to receive an accurately fitting tapered surface on a collet carrier 80 which, in turn, receives a spring-gripped collet member 90 provided with the threads and gripping nut 91 corresponding to the nut or collar 50, previously described.

Instead of the balls 12, which provide only point and line contact in their effective position, I may secure longer wear and more rugged holding effect by means of segmental elements 72 having rounded surfaces 76 fitting into grooves 75 corresponding to the grooves 15. The ends of these segmental members are parallel and rounded to facilitate machining the openings receiving them and in order move radially in openings extending through the wall of the tapered head.

These locking elements present engaging surfaces closely fitting the complementary groove in the outer face of the collet carrier 80. This presents a circumferential support or securing engagement over a considerable area, as compared to the line contact of the balls serving the same locking function.

Likewise, the engagement in the fitting surfaces of the opening in the head member at the upper and lower faces provides a relatively firm and long wearing contact, as compared to the line contact of the balls 12 with the openings 5.

The outer surface of the locking elements 72 are curved to precisely fit the inner surface of the sliding sleeve 100, corresponding to the sleeve 20. The locking elements may be permitted to move outwardly into a groove 105 corresponding to the groove 25, having a sloping side 108, as shown. Thus, when the sleeve 100 is moved upwardly (to the left in Fig. 8) the groove 105 is brought opposite the outer faces of the locking elements, permitting them to move outwardly sufficiently to clear the groove 15 in the collet carrier. The other direction of movement of the sleeve causes the sloping side of the groove 105 to act on a bevel 104 to force the elements 72 into the groove 15.

The carrier may now be moved outwardly from its tapered seat, and as it moves the locking elements are shoved outwardly into the groove 105.

To prevent displacement of the locking elements, the openings through the head 73 are provided with an inturned lip 106, limiting the inward movement and preventing them falling out on the inside of the head when the carrier is not in position.

To assure the loosening or displacement of the carrier, it is only necessary to provide means for striking a light but sharp blow on the collet carrier at the inner end. For this purpose, I have shown a knockout pin 110 slidably fitted in the head 73, and having a beveled point or surface at the inner end, adapted to stroke against a beveled edge 112, formed on the inner end of the collet carrier.

The outer end of the pin is preferably provided with a head 115, normally resting against a flat portion of a groove or slot 116 and adapted to engage a beveled portion 117. As the collar 100 is thrust upwardly or inwardly, the pin is driven inwardly, striking sharply against the beveled surface 112. This slight blow is sufficient to release the tight grip of the fitted tapered surfaces between the collet carrier and head, allowing the carrier to be freely removed.

As stated in connection with the form shown in Fig. 1, gravity normally holds the locking elements in engaging position, but it is preferable to use a latching or spring actuated means for holding the locking collar 100 in the locking position.

In the form shown in Fig. 8, I may provide one or preferably several sliding pins 120, normally urged toward the shoulder 121 by the springs 125, and thus acting to exert a downward or outward thrust upon the collar 100.

Limiting the outward movement, I may provide a retaining collar 130, held by screw elements 132, secured in the outer end of the collet carrier receiving portion of the head 73, and fitted into a counter-bore 133 in the sleeve 100.

Figure 11:
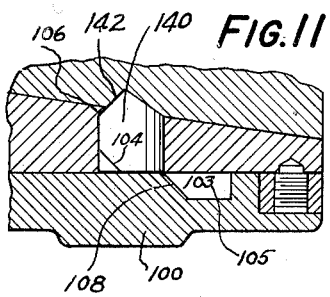
Fig. 11 is a view similar to Fig. 10, showing a modified form of the locking member.
Figure 9:
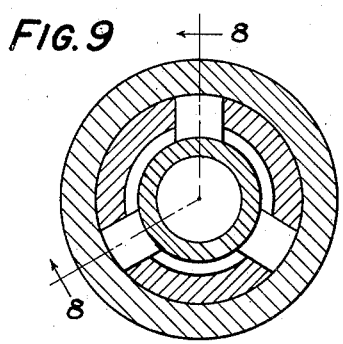
Fig. 9 is a transverse section taken on a plane, indicated by the line 9—9 of Fig. 8.
Figure 12:
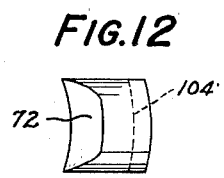
Fig. 12 is a plan of one of the locking elements removed.
Figure 14:
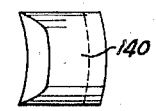
Figs. 14 and 15 are similar views, respectively, of the modified form of locking element shown in Fig. 11.
Figure 13:
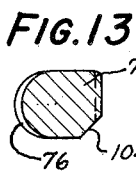
Fig. 13 is an enlarged sectional detail of the same.
Figure 15:
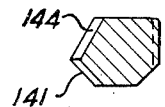
Figure 16:
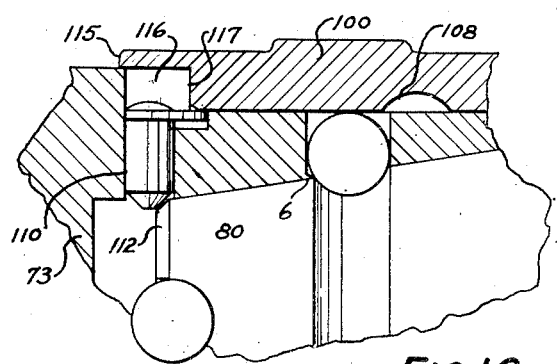
Fig. 16 is a sectional detail showing the releasing position of a releasing pin.

The locking elements of this modified form, instead of having rounded inner faces may have flat surfaces at an angle to each other. Thus, the elements 140, shown in Figs. 11, 14 and 15, are formed as segments of a curve with rounded parallel ends, as are the elements 72, the outer face fitting the inner surface of the sleeve 100, while at the inner side is a beveled surface 141 at an angle of approximately forty-five degrees, presented to a corresponding surface 142, functioning as does the upper side of the groove 15, engaging either the balls 12 or the rounded surfaces 76 of the elements 72.

The opposing beveled surface 144 is more gradually sloped to facilitate entry of the collet carrier as before the clearance groove 105 have a sloping side at 108 for sliding or camming the locking elements into position.

The shank portion of the carrier, shown in Fig. 8, is preferably provided with a long central bore 71, which may permit a long shank tool to extend above the gripping collet.

Screw threads shown at 146 may serve for special locking of the driving shank when desired.

Various modifications of my invention may be made without departing from the spirit and intent, as defined in the appended claims.

I claim:

1. A chuck having a driving shank and a head portion with a tapered socket in the head portion and an opening therethrough, a tool carrier member having a taper fitting the socket, a sleeve surrounding the head and having surface acting in one position to cause the locking element to engage the carrier shoulder and in another position to release the locking element, a movable element projecting inwardly from the head for striking a blow exerting outward axial force on the carrier, and means on said sleeve for actuating the element and effecting the striking of the blow when the sleeve is moved to the releasing position.

2. A chuck having a driving shank and enlarged head portion provided with a tapered socket, a tool carrying member having a tapered surface fitting said socket and coacting driving surfaces brought into engagement when the carrier is moved into the socket, a sleeve slidable on the head, a locking element radially movable in the head, and a groove in the carrier surface, and another groove on the inner surface of the sleeve, the groove on the carrier being adapted to be tightly engaged by the locking element when the sleeve is in one position, and the groove in the sleeve presenting clearance space for permitting outward movement of the locking element when the sleeve is in releasing position, and spring actuated means for holding the sleeve in locking position.

3. In a chuck the combination of a driving head having a tapered socket, a carrier adapted to be closely fitted into said socket, axially slidable means for locking the carrier in the socket, a movable element carried by the head and adapted to impinge against the carrier for striking a sharp blow on the carrier consequent upon the release of the locking element by movement of the axially slidable means.

4. A chuck having a driving head with a tapered socket for receiving the tapered surface of a tool carrier, a tool carrier fitting therein, a movable locking element, a sleeve slidable on the head for holding the element in locking position, a movable element for striking a blow on the inner end of the carrier, and a shoulder on the sleeve for impinging against and actuating said latter element when the sleeve is moved to lock-releasing position.

5. In a chuck the combination of a driving and carrying head having a tapered socket, a tool carrier having a tapered surface fitting the head, the carrier having a groove partially circular in cross section, balls movably carried by the head, and a sleeve having a cylindrical inner surface slidably embracing the head and having a groove also adapted to receive and closely fit a portion of the surface of the balls whereby axial movement of the sleeve to one position forces and holds the balls into locking engagement with the carrier and exerting inward pressure on the balls and presents its groove permitting outward releasing movement of the balls in another position, the head having radial openings into which the balls are closely fitted to permit the radial movement while preventing distortion under locking pressure.

6. In a chuck the combination of a driving and carrying head having a taper socket, a tool carrier having a surface adapted to fit into said socket, said head having a radial opening extending from said surface to the outer side of the head, an accurately machined locking element closely fitted into said opening and movable radially, and means limiting inward movement of the element in the absence of said carrier, the carrier having a recess adapted to receive and closely fit a convex surface on said element, and a sleeve axially movable on the head and having a cylindrical inner surface for holding the locking element in its carrier-engaging position and having a groove permitting outward movement of the locking element for releasing the carrier to permit removal of the carrier.

7. In a chuck, the combination of a driving and carrying head having a tapered socket, a tool carrier having a tapered surface fitting the head, the carrier having a recess, a locking element movably carried by the head, a sleeve slidably embracing the head and having a recess adapted to allow outward movement of the locking element and so positioned that axial movement of the sleeve forces the element into locking engagement when in one position, and presents its recess to permit outward releasing movement of the element when in another position, and a radially inwardly projecting driving pin fixed in the head and engaging the carrier and adapted to shear under excessive strain on the tool.

8. In a chuck the combination with a shank and head portion having a tapered socket, the socket having an axial clearance bore extending a distance into the shank comparable to the axial length of the tapered socket, a tool carrier member fitting into said socket, the carrier having means for gripping a working tool and having a recess presenting a shoulder, the head having an opening, a locking element radially movable in said opening and a sleeve having surfaces for moving the locking element into engagement with the recess shoulder as the sleeve is moved axially, the means for gripping the working tool being adapted to engage the surface of the tool at various positions, holding it concentrically while permitting axial adjustment.

9. A chuck having a driving shank and a head portion with a tapered socket in the head portion and an accurately machined radial opening therethrough, a tool carrier member having a taper fitting into the socket and having an accurately machined groove adapted to radially align with said opening, a locking element radially movable and closely fitted in said opening and adapted to fit into said groove and closely engage the same at the sides as well as the bottom thereof, a sleeve surrounding the head and having a groove formed outwardly from the head adapted to permit the locking element to move outwardly when the sleeve is in one position, the sleeve closely fitting the head and having a surface adapted to exert a pressure holding the locking element in engagement with the groove on the tool carrier member.

10. The structure defined in claim 9 in which are provided a plurality of shearable driving elements projecting radially inwardly from the head and the carrier member having coacting shoulders tightly engaging both sides of each driving element when the carrier member is in its operative position.

WINDSOR N. CHITTENDEN.

REFERENCES CITED

The following references are of record in the file of this patent:

UNITED STATES PATENTS

| Number | Name | Date |
| --- | --- | --- |
| 881,075 | Hasking | Mar. 3, 1908 |
| 1,278,427 | Bocorselski | Sept. 10, 1918 |
| 1,305,257 | Dufresne | June 3, 1919 |
| 1,449,440 | Plank | Mar. 27, 1923 |
| 1,636,421 | Knott | July 19, 1927 |
| 1,863,108 | Glenzer | June 14, 1932 |
| 1,973,942 | Buhr | Sept. 18, 1934 |
| 2,272,185 | Chittenden | Feb. 10, 1942 |
| 2,463,253 | Earle | Mar. 1, 1949 |

FOREIGN PATENTS

| Number | Country | Date |
| --- | --- | --- |
| 1,732 | Great Britain | of 1913 |